United States Patent [19]

Sugasawa et al.

[11] 4,354,471
[45] Oct. 19, 1982

[54] INTERNAL COMBUSTION ENGINE

[75] Inventors: Fukashi Sugasawa, Yokohama; Haruhiko Iizuka, Yokosuka, both of Japan

[73] Assignee: Nissan Motor Company, Limited, Yokohama, Japan

[21] Appl. No.: 149,860

[22] Filed: May 14, 1980

[30] Foreign Application Priority Data

May 15, 1979 [JP] Japan .................. 54-59325

[51] Int. Cl.³ .............................................. F02D 17/02
[52] U.S. Cl. .................................. 123/481; 123/198 F
[58] Field of Search ............................. 123/198 F, 481

[56] References Cited

U.S. PATENT DOCUMENTS

| 4,186,715 | 2/1980 | Iizuka .................. 123/198 F |
| 4,245,471 | 1/1981 | Sugasawa ............ 123/198 F |
| 4,249,374 | 2/1981 | Sugasawa ............ 123/198 F |

FOREIGN PATENT DOCUMENTS 3011735 3/1980 Fed. Rep. of Germany .
54-113729 9/1979 Japan .................. 123/198 F
55-69736 5/1980 Japan .
2041078 9/1980 United Kingdom .

*Primary Examiner*—Ronald B. Cox
*Attorney, Agent, or Firm*—Schwartz, Jeffery, Schwaab, Mack, Blumenthal & Koch

[57] ABSTRACT

An internal combustion engine is disclosed which includes active and inactive cylinders, an intake passage divided into first and second branches leading to the active and inactive cylinders, respectively, valve means provided at the entrance of the second intake passage, and fuel supply means for supplying a controlled amount of fuel into the active and inactive cylinders. A load detector is provided for detecting engine load to provide a low load indication signal to the fuel supply means which thereby cuts off the supply of fuel to the inactive cylinders and also to the valve means which thereby cuts off the flow of air to the inactive cylinders. Delay means is provided for delaying the start and end of application of the low load indication signal to the fuel supply means.

6 Claims, 3 Drawing Figures

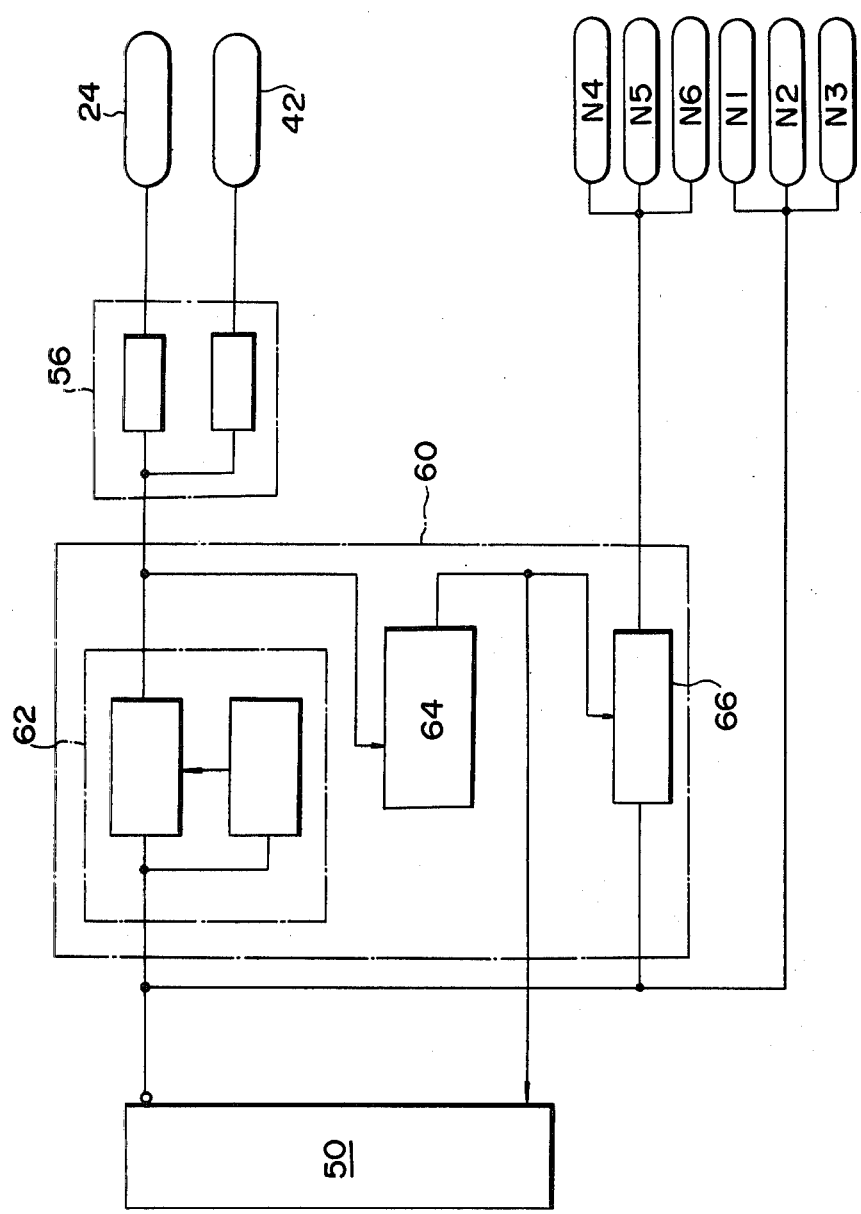

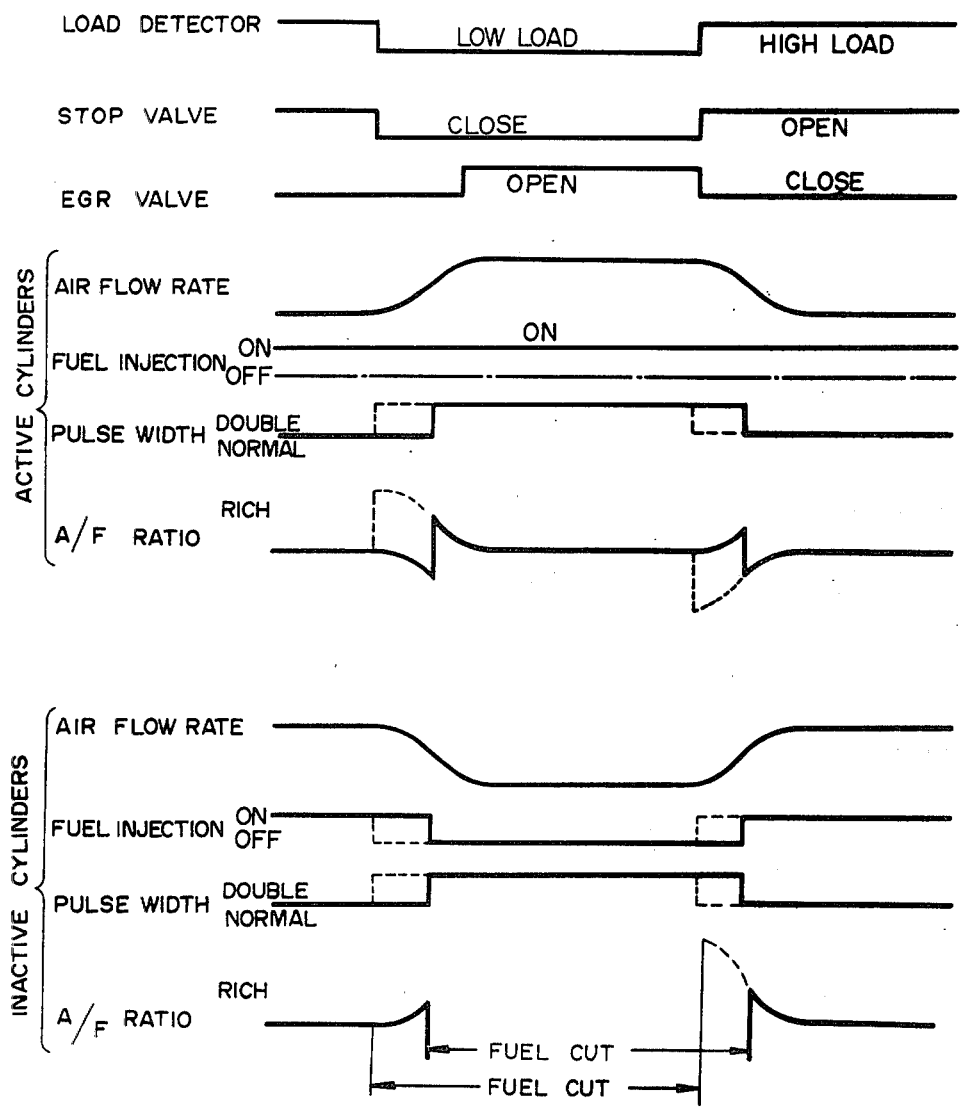

1

INTERNAL COMBUSTION ENGINE

BACKGROUND OF THE INVENTION

1. Field of the Invention

This invention relates to improvements in an internal combustion engine of the split type, operable on less than all of its cylinders when the engine load is below a given value.

2. Description of the Prior Art

In general, internal combustion engines demonstrate higher efficiency and thus higher fuel economy when running under higher load conditions. In view of this fact, split type internal combustion engines have already been proposed which have active cylinders which are always active and inactive cylinders which are inactivated when the engine load goes below a given value. Such split engines usually have an intake passage divided into first and second branches, the first branch being associated with the active cylinders and the second branch being associated with the inactive cylinders. The intake passage is usually provided with a stop valve. Such split engine operating system may be responsive to an engine load drop below a given value to close the stop valve so as to cut off the flow of air to the inactive cylinders and also to cut off the flow of fuel to the inactive cylinders while increasing the amount of fuel and air to the active cylinders when operating in a split engine mode where the engine operates only on the active cylinders. This increases the active cylinder loads in a split type engine, resulting in higher fuel economy.

One difficulty with such split type internal combustion engines is that a large change occurs in air/fuel ratio, resulting in an increase in exhaust emissions and a reduction in fuel economy when engine operation is shifted between its full engine and split engine modes. The reason for this is that the amount of fuel supplied to the cylinders is generally doubled or reduced to half as the engine load goes below or above a given value while the stop valve closes or opens with a delay due to friction and air resistance.

SUMMARY OF THE INVENTION

It is therefore one object of the present invention to eliminate the above described disadvantages found in conventional split type internal combustion engines.

Another object of the present invention is to provide an improved split type internal combustion engine which can minimize air/fuel ratio changes when engine operation is shifted between full and split engine modes.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The present invention will be described in greater detail by reference to the following description taken in connection with the accompanying drawings, in which:

FIG. 2 is a diagram showing a significant portion of one embodiment of the present invention; and FIG. 3 is a timing chart used in explaining the operation of the present invention.

DESCRIPTION OF THE PREFERRED EMBODIMENT

Figure 1:
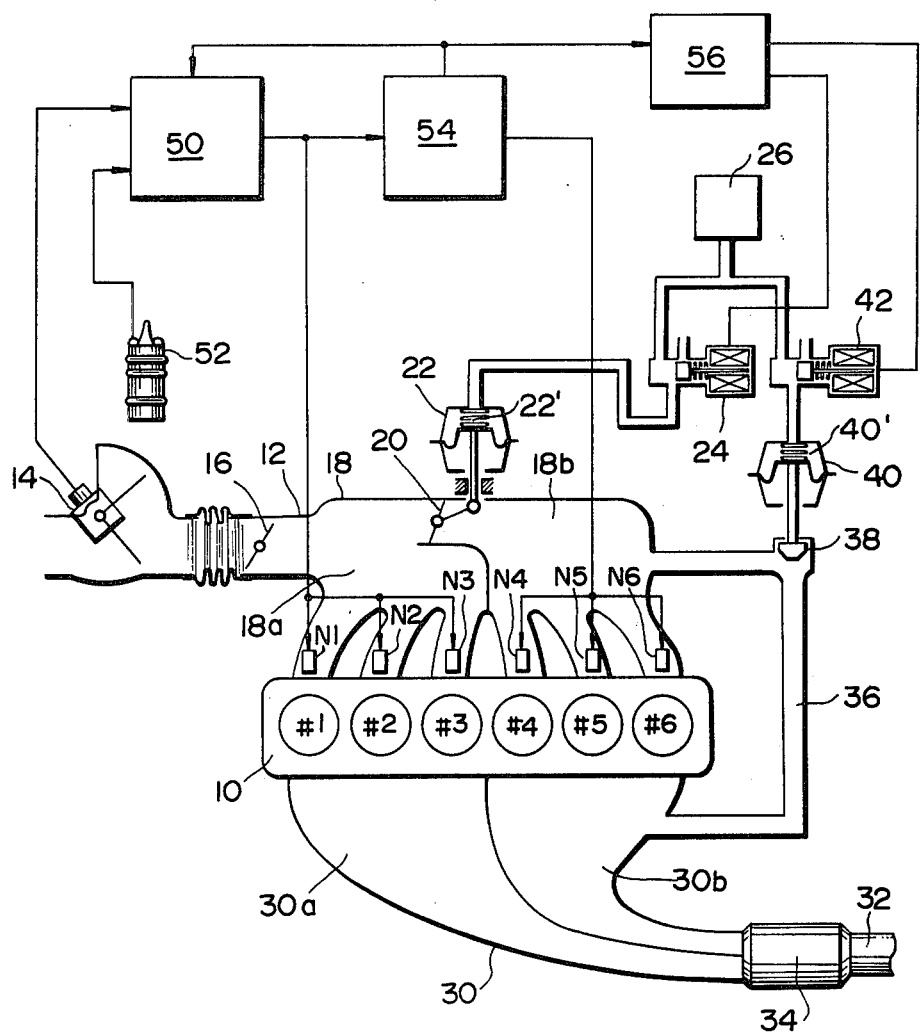
FIG. 1 is a schematic view showing a conventional split type internal combustion engine.

Prior to the description of the preferred embodiment of the present invention, we shall briefly describe the prior art split type internal combustion engine in FIG. 1 in order to specifically point out the difficulties attendant thereon.

Referring to FIG. 1, the reference numeral 10 designates an engine block containing therein an active cylinder unit including three cylinders #1 to #3 which are always active and an inactive cylinder unit having three cylinders #4 to #6 which are inactivated when the engine load is below a predetermined value.

Air is supplied to the engine through an air induction passage 12 provided therein with an air-flow meter 14 and a throttle valve 16 drivingly connected to the accelerator pedal (not shown) for controlling the flow of air to the engine. The induction passage 12 is connected downstream of the throttle valve 16 to an intake manifold 18 which is divided into first and second intake passages 18a and 18b. The first intake passage 18a leads to the active cylinders #1 to #3 and the second intake passage 18b leads to the inactive cylinders #4 to #6. The second intake passage 18b is provided at its entrance with a stop valve 20.

The stop valve 20 is driven by a first pneumatic valve actuator 22 which includes a diaphragm spread within a casing to define therewith two chambers on the opposite side of the diaphragm, and an operation rod having its one end centrally fixed to the diaphragm and the other end thereof drivingly connected to the stop valve 20. The working chamber 22' is connected to the outlet of a first three-way solenoid valve 24 which has an atmosphere inlet communicated with atmospheric air and a vacuum inlet connected to a vacuum tank 26. The first three-way solenoid valve 24 is normally in a position providing communication of atmospheric pressure to the working chamber 22' of the first valve actuator 22 so as to open the stop valve 20. In response to a valve drive signal from a valve drive circuit to be described later, the first three-way solenoid valve 24 moves to another position wherein communication is provided between the vacuum tank 26 and the working chamber 22' of the first valve actuator 22 so as to close the stop valve 20.

The engine also has an exhaust manifold 30 which is divided into first and second exhaust passages 30a and 30b leading from the active cylinders #1 to #3 and the inactive cylinders #4 to #5, respectively. The exhaust manifold 30 is connected at its downstream end to an exhaust duct 32 provided therein with a catalytic converter 34 for effecting oxidation of HC and CO and reduction of NOx so as to minimize the emission of pollutants through the exhaust duct 32.

An exhaust gas recirculation (EGR) passage 36 is provided which has its one end opening into the second exhaust passage 30b and the other end thereof opening into the second intake passage 18b. The EGR passage 36 has therein an EGR valve 38 which is driven by a second pneumatic valve actuator 40 substantially similar in structure to the first valve actuator 22. The working chamber 40' of the second valve actuator 40 is connected to the outlet of a second three-way solenoid valve 42 which has an atmosphere inlet communicated with atmospheric air and a vacuum inlet connected to the vacuum tank 26. The second three-way solenoid valve 42 is normally in a position providing communication of atmospheric pressure to the working chamber 40' of the second valve actuator 40 so as to close the EGR valve 38. In response to a valve drive signal from the valve drive circuit to be described, the second three-way solenoid valve 42 moves to another position wherein communication is provided between the vacuum tank 26 and the working chamber 40' of the second valve actuator 40 so as to open the EGR valve 38.

An injection control circuit 50 is provided which is adapted to provide, in synchronism with spark pulses from an ignition coil 52, a fuel-injection pulse signal of pulse width proportional to the air flow rate sensed by the air-flow meter 14. The fuel-injection pulse signal is applied directly to fuel injection valves $N_1$ to $N_3$ for supplying fuel to the respective active cylinders #1 to #3 and also through a split engine operating circuit 54 to fuel injection valves $N_4$ to $N_6$ for supplying fuel to the respective inactive cylinders #4 to #6. The split engine operating circuit 54 determines the load at which the engine is operating from the pulse width of the fuel-injection pulse signal.

At high load conditions, the split engine operating circuit 54 allows the passage of the fuel-injection pulse signal to the fuel injection valves $N_4$ to $N_6$ and provides a high load indicative signal to the injection control circuit 50 and to a valve drive circuit 56. The valve drive circuit 56 is responsive to the high load indicative signal to hold the first and second three-way valves 24 and 42 in their normal positions and as a result the stop valve 20 is open and the EGR valve 38 is closed. When the engine load falls below a given value, the split engine operating circuit 54 cuts off the flow of the fuel-injection pulse signal to the fuel injection valves $N_4$ to $N_6$ and provides a low load indicative signal to the injection control circuit 50 and also to the valve drive circuit 56. The injection control circuit 50 is responsive to the low load indicative signal to double the pulse width of the fuel-injection pulse signal. The valve drive circuit 56 is responsive to the low load indicative signal to provide a valve drive signal to the first three-way valve 24 and also to the second three-way valve 42 with a delay. As a result, the first three-way valve 24 provides communication between the vacuum tank 26 and the working chamber 22' of the first valve actuator 22 so as to close the stop valve 20 simultaneously with occurrence of the low load indicative signal, whereas the second three-way valve 42 provides communication between the vacuum tank 26 and the working chamber 40' of the second valve actuator 40 so as to open the EGR valve 38 a time after the low load indicative signal occurs.

The operation of the above conventional split internal combustion engine is as follows: At high load conditions, the split engine operating circuit 54 provides a high load indicative signal to the injection control circuit 50 and to the valve drive circuit 56, whereby the stop valve 20 is open to allow the flow of air to the cylinders #4 to #6 and the EGR valve 38 is closed to inhibit recirculation of exhaust gases to the second intake passage 18b. In addition, the split engine operating circuit 54 allows the passage of the fuel-injection pulse signal from the injection control circuit 50 to the fuel injection valves $N_4$ to $N_6$. Accordingly, the engine is in a full engine mode of operation.

When the engine load falls below a predetermined value, the split engine operting circuit 54 provides a low load indicative signal to the valve drive circuit 56 which thereby closes the stop valve 20 so as to cut off the flow of air to the inactive cylinders #4 to #6 and opens the EGR valve 38 with a delay so as to allow recirculation of exhaust gases into the second intake passage 18b. That is, the stop valve 20 closes simultaneously with occurrence of the low load indicative signal while the EGR valve 38 opens after the stop valve 20 fully closed. This is effective to prevent the exhaust gases charged in the second intake passage 18b from flowing through the stop valve 20 into the first intake passage 18a. Such exhaust gas recirculation is for the purpose of minimizing pumping losses in the inactive cylinders #4 to #6. In addition, the low load indicative signal is applied to the injection control circuit 50 which thereby doubles the pulse width of the fuel-injection pulse signal. That is, the amount of fuel supplied to each of the active cylinders #1 to #3 is doubled since the amount of air introduced to each of the active cylinders #1 to #3 is doubled due to the closing of the stop valve 20.

With such a conventional arrangement, however, a great change occurs in air/fuel ratio when engine operation is shifted between full engine and split engine modes, resulting in an increase in exhaust emissions and a reduction in fuel economy when engine operation is shifted between full and split engine modes. These difficulties stem mainly from the conventional design such that the pulse width of the fuel-injection pulse signal is doubled or reduced to its initial value simultaneously with occurrence of the low or high load indication signal. For example, the stop valve 20 requires a time before it fully closes to double the amount of air to each of the active cylinders after the low load indicative signal occurs to start closing of the stop valve 20. During the time, the amount of air to each of the active cylinders gradually increases and an rich air/fuel ratio appears until the stop valve 20 fully closes.

FIG. 2 is a block diagram showing a significant portion of the split engine constructed in accordance with the present invention, which is substantially similar to the structure of FIG. 1 except for the split engine operating circuit arrangement. Parts in FIG. 2 which are like those in FIG. 1 have been given the same reference character.

Referring to FIG. 2, the split engine operating circuit 60 of the present invention comprises a load detector 62 adapted to determine the load at which the engine is operating from the pulse width of the fuel-injection pulse signal from the injection control circuit 50. The load detector 62 provide a low load indicative signal at low load conditions and a high load indicative signal at high load conditions. The output of the load detector 62 is applied to the valve drive circuit 56 in the same manner as described above and through a delay circuit 64 to the injection control circuit 50 and also to a cut-off circuit 66. The delay circuit 64 delays the passage of the load indicative signal from the load detector 62 to the circuits 50 and 66. The cut-off circuit 66 is responsive to a low load indicative signal for cutting off the flow of the fuel-injection pulse signal to the fuel injection valves $N_4$ to $N_6$.

The operation of the split engine of the present invention will now be described with reference to the timing chart of FIG. 3 wherein the solid lines relate to the split engine of the present invention and the broken lines relate to a conventional split engine as described in connection with FIG. 1.

When engine operation is shifted from a full engine mode to a split engine mode, the output of the load detector 62 changes from a high load indicative signal to a low load indicative signal. In response to this change, the valve drive circuit 56 closes the stop valve 20 so as to cut off the flow of air to the inactive cylinders #4 to #6 and opens the EGR valve 38 with a delay so as to reintroduce exhaust gases into the second intake passage 18b after the stop valve 20 fully closes. The delay circuit 64 delays transmission of the occurrence of the low load indicative signal to the injection control circuit 50 and the cut-off circuit 66 so that the pulse width of the fuel-injection pulse signal remains at the normal value and the fuel injection valves $N_4$ to $N_6$ remain supplied with the fuel injection pulse signal for a time corresponding to the delay determined in the delay circuit 64 as shown in FIG. 3. That is, the injection control circuit 50 doubles the pulse width of the fuel-injection pulse signal at the same time when the fuel-cut circuit 66 cuts off the flow of the fuel-injection pulse signal to the fuel injection valves $N_4$ to $N_6$, but before the stop valve 20 fully closes to cut off the flow of air to the inactive cylinders #4 to #6. Preferably, the length of the delay may be determined such that the pulse width of the fuel-injection pulse signal is doubled when the rate of air flow through the second intake passage 18b to the inactive cylinders #4 to #6 falls to half, in which case, means may be used to detect the stop valve 20 being at a position where the rate of air flow to the inactive cylinder #4 to #6 is half that occuring when the stop valve 20 is at its fully open position. As a result, the air/fuel ratio of a mixture charged in the active cylinders #1 to #3 is held at an optimum value without becoming excessively rich. In the inactive cylinders #4 to #6, the air/fuel ratio does not become very rich due to the presence of some fresh air therein and relatively good combustion even if fuel cut therefor is somewhat delayed.

When engine operation is shifted from the split engine mode to a full engine mode, the output of the load detector 62 changes from the low load indicative signal to a high load indicative signal. In response to this change, the valve drive circuit 56 opens the stop valve so as to allow the flow of air to the inactive cylinders #4 to #6 and simultaneously closes the EGR valve 38 so as to stop the exhaust gas recirculation as shown in FIG. 3. The delay circuit 64 delays transmission of the occurrence of the high load indicative signal to the injection control circuit 50 and the cut-off circuit 66 so that the pulse width of the fuel-injection pulse signal remains doubled and the fuel injection valves $N_4$ to $N_6$ remain supplied with no fuel injection pulse signal for a time corresponding to the delay determined in the delay circuit 64 as shown in FIG. 3. That is, the injection control circuit 50 returns the pulse width of the fuel-injection pulse signal to its initial value at the same time when the fuel-cut circuit 66 resumes the passage of the fuel-injection pulse signal to the fuel injection valves $N_4$ to $N_6$, but before the stop valve 20 fully opens. Thus, the amount of fuel supplied to the active cylinders #1 to #3 cannot be reduced to half when the amount of air introduced to them is double that introduced during a full engine mode of operation. Since the pulse width of the fuel-injection pulse signal is reduced to half after the amount of air introduced to the active cylinders #1 to #3 is reduced to ¾, the air/fuel ratio of a mixture produced in the active cylinders can be held at an optimum value. Furthermore, since the flow of fuel is resumed to the inactive cylinders #4 to #6 with a delay determined by the delay circuit 64, fuel cannot be injected before no fresh air is introduced thereinto and recirculated exhaust gases are discharged therefrom. This saves fuel and prevents a temporary increase in HC and CO emissions.

While the present invention has been described in connection with a six cylinder engine, it is to be noted that the particular engine shown is only for illustrative purposes and the structure of this invention could be readily applied to any split engine structure. While the present invention has been described in conjunction with a specific embodiment thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. An internal combustion engine comprising:
   (a) first and second cylinder units each including at least one cylinder;
   (b) an intake passage provided therein with a throttle valve, said intake passage being divided downstream of said throttle valve into first and second branches leading to said first and second cylinder units, respectively;
   (c) a load detector adapted to detect the load at which said engine is operating and provide a low load indication signal when the engine load is below a predetermined value;
   (d) fuel supply means for supplying a controlled amount of fuel into said first and second cylinder units, said fuel supply means being responsive to the low load indication signal for cutting off the supply of fuel to said second cylinder unit;
   (e) valve means provided at the entrance of said second intake passage branch, said valve means being resonsive to the low load indication signal for cutting off the flow of air to said second cylinder unit; and
   (f) delay means for delaying the start and end of application of the low load indication signal to said fuel supply means.

2. An internal combustion engine according to claim 1, wherein said fuel supply means is responsive to the low load indication signal for increasing the amount of fuel supplied to said first cylinder unit to N times the initial amount where N is the ratio of the total number of said cylinders included in said first and second cylinder units to the number of said cylinder(s) included in said first cylinder unit.

3. An internal combustion engine comprising:
   (a) first and second cylinder units each including at least one cylinder;
   (b) an intake passage provided therein with a throttle valve and divided downstream of said throttle valve into first and second branches leading to said first and second cylinder units, respectively;
   (c) a load detector, responsive to said engine load, for providing a low load indication signal when the engine load is below a predetermined value;
   (d) a stop valve provided in the vicinity of an entrance of said intake passage second branch, said stop valve when closed being operable to shut off air flow to said second cylinder unit in response to the low load indication signal from said load detector;

(e) fuel supply means, responsive to various engine operating parameters, for supplying a controlled amount of fuel into said first and second cylinder units, said fuel supply means being responsive to the low load indication signal, for terminating fuel supply to said second cylinder unit and increasing the amount of fuel to be supplied into said first cylinder unit for the same engine operating parameters; and (f) delay means provided between said load detector and said fuel supply means for delaying the start and end of apoplication of the low load indication signal from said load detector to said fuel supply means by a predetermined time corresponding to the time required for said stop valve to move between its fully open and closed positions.

4. An internal combustion engine according to claim 3, wherein said delay means delays the start of application of the low load indication signal by a predetermined time sufficient for the rate of air flow through said intake passage second branch to fall to half.

5. An internal combustion engine according to claim 4, wherein said delay means includes means for detecting said stop valve being at a position where the rate of air flow through said intake passage second branch is half that occurring when said stop valve is at its fully open position.

6. An internal combustion engine according to claim 3, wherein said delay means delays the end of application of the low load indicative signal a predetermined time sufficient for the rate of air flow into said first cylinder unit to fall to three-fourths.

* * * * *